United States Patent
Lesso (10) Patent No.: US 12,529,730 B2
(45) Date of Patent: Jan. 20, 2026

(54) CIRCUITRY FOR MEASUREMENT OF ELECTROCHEMICAL CELLS

(71) Applicant: Cirrus Logic International Semiconductor Ltd., Edinburgh (GB)

(72) Inventor: John P. Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 355 days.

(21) Appl. No.: 18/307,369

(22) Filed: Apr. 26, 2023

(65) Prior Publication Data

US 2023/0384390 A1 Nov. 30, 2023

Related U.S. Application Data (60) Provisional application No. 63/345,457, filed on May 25, 2022.

(51) Int. Cl.
*G01R 31/389* (2019.01)
*G01R 31/367* (2019.01)
*G01R 31/385* (2019.01)
*G01R 31/392* (2019.01)

(52) U.S. Cl.
CPC ......... *G01R 31/389* (2019.01); *G01R 31/367* (2019.01); *G01R 31/385* (2019.01); *G01R 31/392* (2019.01)

(58) Field of Classification Search
None
See application file for complete search history.

(56) References Cited

U.S. PATENT DOCUMENTS

| | | | | |
|---|---|---|---|---|
| 9,933,387 | B1 * | 4/2018 | McCanna | G01N 27/3273 |
| 2010/0276734 | A1 * | 11/2010 | Josowicz | G01N 27/3277 |
| | | | | 257/253 |
| 2018/0043778 | A1 * | 2/2018 | Murbach | G01R 31/389 |
| 2020/0363476 | A1 * | 11/2020 | Liu | H02J 7/00 |

FOREIGN PATENT DOCUMENTS

| | | |
|---|---|---|
| CN | 216927033 U | 7/2022 |
| CN | 109472079 A | 11/2022 |

OTHER PUBLICATIONS

Combined Search and Examination Report under Sections 17 and 18(3), UKIPO, Application No. GB2306131.0, mailed Oct. 11, 2023.

* cited by examiner

*Primary Examiner* — Raymond L Nimox
(74) *Attorney, Agent, or Firm* — Jackson Walker L.L.P.

(57) ABSTRACT

Circuitry for determining an impedance of an electrochemical cell comprising at least one first electrode and a second electrode, the circuitry comprising: drive circuitry configured to apply a stimulus to the electrochemical cell, the stimulus having a stimulation frequency and a stimulation amplitude; and measurement circuitry configured to: measure an output of the electrochemical cell to generate an output signal; separate the output signal into a linear component and a non-linear component; and determine the impedance of the cell based on the linear component of the response.

30 Claims, 8 Drawing Sheets

CIRCUITRY FOR MEASUREMENT OF ELECTROCHEMICAL CELLS

The present disclosure claims priority to U.S. Provisional Patent Application Ser. No. 63/345,457, filed May 25, 2022, which is incorporated by reference herein in its entirety.

TECHNICAL FIELD

The present disclosure relates to circuitry for measuring characteristics in electrochemical cells.

BACKGROUND

Electrochemical sensors are widely used for the detection or characterisation of one or more particular chemical species, analytes, as an oxidation or reduction current. Such sensors comprise an electrochemical cell, consisting of two or more electrodes configured for contact with an analyte whose concentration is to be ascertained. Such sensors also comprise circuitry for driving one or more of the electrodes and for measuring a response signal at one or more of the electrodes. The measured response signal can be processed to determine a concentration of an analyte.

Electrochemical Impedance Spectroscopy (EIS) can be used to interrogate an electrochemical cell to obtain information about a condition of the electrochemical cell. Such information can be used to improve measurements taken with a sensor comprising the electrochemical cell. Electrochemical cells are inherently non-linear in nature, whereas impedance is inherently linear in nature. As such, the amplitude of a stimulus used to measure impedance tends to be limited, which in turn limits the signal-to-noise ratio (SNR) of impedance measurements using an electrochemical cell.

SNR can be improved by extending acquisition times, at the cost of power consumption. However, when such circuitry is battery powered, for example when an electrochemical sensor is integrated into a wearable device, it is desirable for the sensor to be as small as possible and use as little power as possible.

SUMMARY

According to a first aspect of the disclosure, there is provided circuitry for determining an impedance of an electrochemical cell comprising at least one first electrode and a second electrode, the circuitry comprising: drive circuitry configured to apply a stimulus to the at least one first electrode of electrochemical cell, the stimulus having a stimulation frequency and a stimulation amplitude; and measurement circuitry configured to: measure an output of the electrochemical cell to generate an output signal; separate the output signal into a linear component and a non-linear component; and determine the impedance of the cell based on the linear component of the response.

The stimulus may comprise a chirp signal (also known as a sweep signal). By using a chirp signal, linear and non-linear components of the output signal can be separated using deconvolution, as explained below. In some embodiments, the chirp signal may be an exponential chirp signal or a logarithmic chirp signal. In some embodiments, the stimulus may comprise a signal whose frequency increases (up-chirp) over time. Alternatively, the stimulus may comprise a signal whose frequency decreases (down-chirp) over time. Alternatively, the stimulus may comprise any combination of up-chirp and down-chirp signals.

The drive circuitry may be configured to hold the at least one electrode at a first bias voltage. The chirp signal may then be applied in addition to the first bias voltage.

The electrochemical cell may comprise a reference electrode. In which case, the drive circuitry may be configured to provide the first bias voltage to the reference electrode.

The stimulus may be configured to induce a linear response from the electrochemical cell to generate the linear component and a non-linear response from the electrochemical cell to generate the non-linear component.

The step of separating the output signal may comprise deconvolving the output signal with the stimulus. For example, separating the output signal may comprise: weighting the stimulus to generate a weighted stimulus; and deconvolving the output signal with the weighted stimulus. Weighting the stimulus may comprise whitening the stimulus. Weighting the stimulus may comprise time-reversing the stimulus to generate the weighted stimulus.

Circuitry of any one of claims 7 to 9, wherein prior to separating the output signal the measurement circuitry is configured to convert the output signal into the frequency domain. Deconvolution may then be performed in the frequency domain.

Deconvolving the output signal with the stimulus may comprises performing a point-wise division of the converted output signal by a Fourier transform of the stimulus. Alternatively, deconvolving the output signal with the stimulus may comprise performing a point-wise multiplication of the converted output signal by a Fourier transform of an inverse of the stimulus. It will be appreciated that point-wise multiplication requires many fewer computational operations than point-wise division.

Whether deconvolving the output signal using point-wise division, point-wise multiplication, or another deconvolution technique, deconvolving the output signal may be implemented with regularisation, such as ridge regularisation.

The measurement circuitry may be configured to: determine a condition of the electrochemical cell based on the non-linear component of the response. The condition may comprise ageing of the electrochemical cell. The measurement circuitry may be configured to separate the non-linear component into a plurality of different harmonics.

The measurement circuitry may be configured to: monitor a characteristic of the non-linear component of the response over time; and determine a condition of the electrochemical cell based on a change in the characteristic. The characteristic may comprise an amplitude of harmonic distortion in the measured response. For example, the characteristic may comprise an amplitude of second order harmonic distortion in the measured response.

The condition may comprises a fault associated with the electrochemical cell, and wherein determining the fault comprises determining that an amplitude of harmonic distortion in the measured response exceeds a predetermined threshold.

The measurement circuitry may be configured to calibrate the linear component of the measured response based on the non-linear component of the response.

The output signal may be an output voltage or an output current.

When the output signal is an output voltage, the measurement circuitry may comprise: a transimpedance amplifier (TIA) configured to convert the output of the electrochemical cell to the output voltage; and an analog-to-digital converter configured to convert the output voltage to a digital output voltage. Alternatively, the measurement circuitry may comprise a current conveyor configured to convert the output of the electrochemical cell to the output voltage; and an analog-to-digital converter configured to convert the output voltage to a digital output voltage.

According to another aspect of the disclosure, there is provided a system, comprising: circuitry of any one of the preceding claims; and the electrochemical cell.

The electrochemical cell may comprise an electrochemical sensor. Alternatively, the electrochemical cell may comprise a battery cell.

According to another aspect of the disclosure, there is provided an electronic device, comprising the circuitry or system described above.

The device may comprise a continuous glucose monitor. The device may comprise one of a mobile computing device, a laptop computer, a tablet computer, a games console, a remote control device, a home automation controller or a domestic appliance, a toy, a robot, an audio player, a video player, or a mobile telephone, and a smartphone.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Embodiments of the present disclosure relate to the measurement of signals (such as analyte signals) in electrochemical cells.

Figure 1:
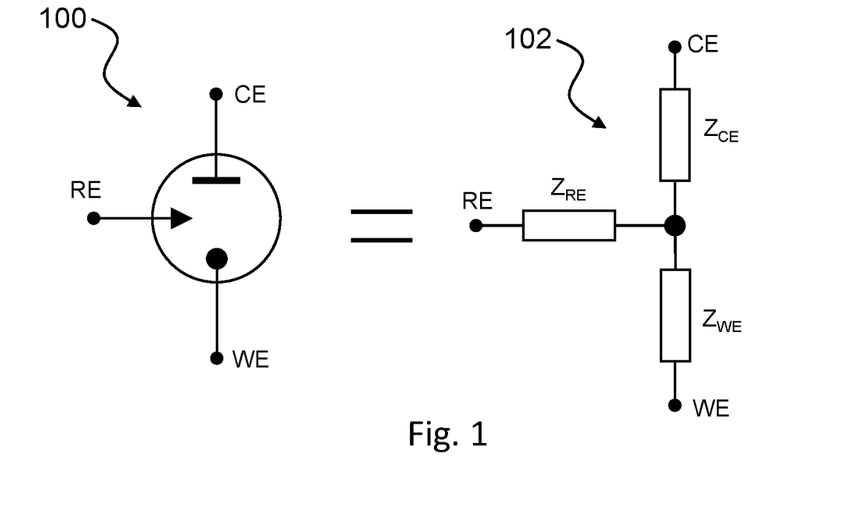
FIG. 1 illustrates a schematic diagram and electrical equivalent circuit for a three-electrode electrochemical cell.

FIG. 1 is a schematic diagram of an electrochemical cell 100 comprising three electrodes, namely a counter electrode CE, a working electrode WE and a reference electrode RE. FIG. 1 also shows an equivalent circuit 102 for the electrochemical cell comprising a counter electrode impedance ZCE, a working electrode impedance ZWE and a reference electrode impedance ZRE.

To determine a characteristic of the electrochemical cell, and therefore an analyte concentration, a bias voltage is applied at the counter electrode CE and a current at the working electrode WE is measured. Feedback is used to set the voltage VRE at the reference electrode RE to be equal to a bias voltage VBIAS1 (as is explained in more detail below). A current IWE at the working electrode WE is then measured. As the resistance in the cell 100 increases, the current measured at the working electrode WE decreases. Likewise, as the resistance in the cell 100 decreases, the current measured at the working electrode WE increases. Thus the electrochemical cell 100 reaches a state of equilibrium where the voltage drop between the reference electrode RE and the working electrode WE is maintained constant. Since the bias voltage at the counter electrode CE and the measured current at WE are known, a characteristic of the analyte contained in the cell 100 can be ascertained.

Figure 2:
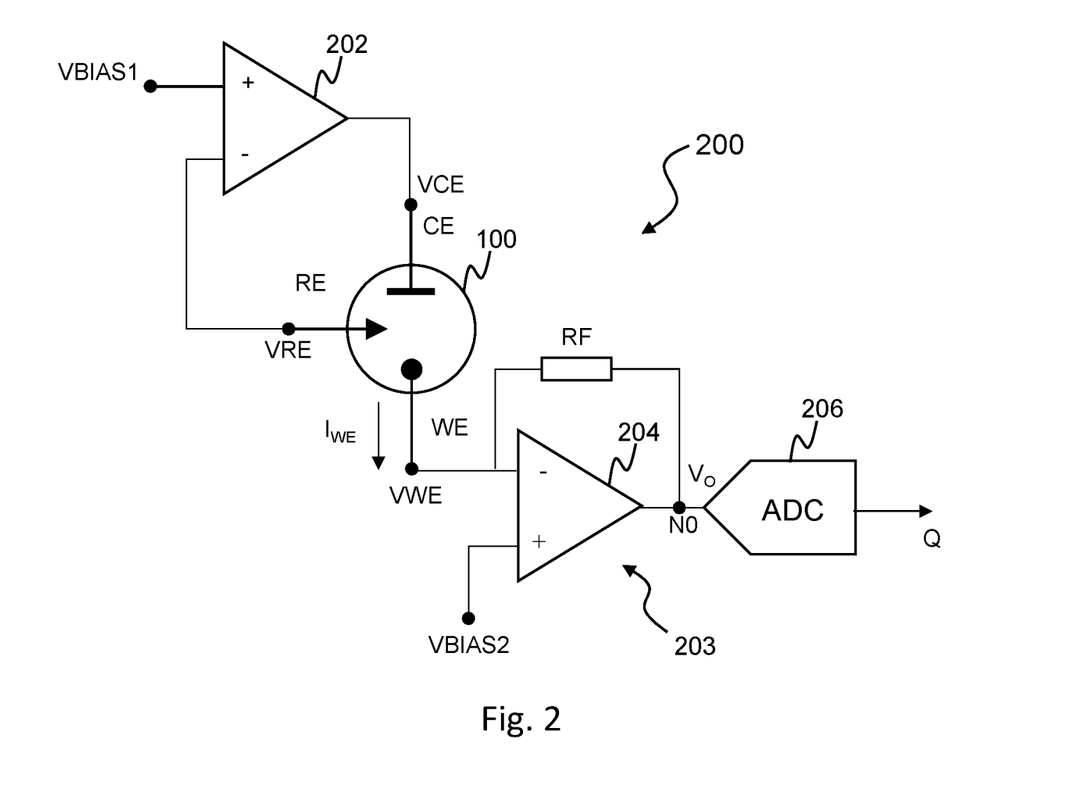
FIG. 2 is a schematic diagram of an example prior art measurement circuit.

FIG. 2 illustrates an example prior art drive and measurement circuit 200 which is configured to implement the above explained cell characterisation, specifically for measuring an analyte concentration in the electrochemical cell 100 shown in FIG. 1. The circuit 200 comprises a first amplifier 202 and a gain stage 203 comprising a second amplifier 204 and a feedback resistor RF. Each of the first and second amplifiers 202, 204 may comprise one or more op-amps. A non-inverting input of the first amplifier 202 is coupled to a bias voltage VBIAS1. An inverting input of the first amplifier 202 is coupled to the reference electrode RE. An output of the first amplifier 202 is coupled to the counter electrode CE and configured to drive the counter electrode CE with a counter electrode bias voltage VCE. The counter electrode bias voltage VCE applied at the counter electrode CE by the first amplifier 202 is proportional to the difference between the bias voltage VBIAS1 and the voltage VRE at the reference electrode RE. As such, the first amplifier 202 acts to maintain the voltage at the reference electrode RE at the bias voltage VBIAS1.

An inverting input of the second amplifier 204 is coupled to the working electrode WE and the non-inverting input of the second amplifier 204 is coupled to a reference voltage, VBIAS2. VBIAS2 may be set to a constant reference voltage, such as half the supply voltage of the circuit 200 (i.e., VDD/2). Alternatively, VBIAS2 may be variable. By controlling the bias voltage VBIAS1 and the reference voltage VBIAS2, a differential bias voltage between the working and reference electrodes WE, RE can be controlled. A feedback loop comprising a feedback resistor RF is coupled between the inverting input and an output of the second amplifier 204. As such, the gain stage 203 operates as a transimpedance amplifier (TIA). The feedback serves to maintain the working electrode WE at the reference voltage VBIAS2 provided at the non-inverting input of the second amplifier 204. The gain stage 203 is thus operable to output an output voltage VO at an output node NO which is proportional to the current IWE at the working electrode WE. The output voltage VO is then provided to an analog-to-digital converter (ADC) 206 which outputs a digital output Q which represents the current IWE at the working electrode WE. As will be explained in more detail below, alternative gain arrangements to that shown in FIG. 2 exists for processing the working electrode current IWE. The arrangements shown in FIG. 2 is provided for example only.

To bias the counter electrode CE, and therefore the electrochemical cell 100, at different voltages, the bias voltage VBIAS1 may be adjusted, for example between ground (e.g. zero volts) and the supply voltage VDD. As an example, with the non-inverting input voltage VBIAS2 of the second amplifier 204 set at VDD/2, a positive bias may be applied to the cell 100 by maintaining the bias voltage VBIAS1 above VDD/2. Likewise, a negative bias may be applied to the cell 100 by maintaining the bias voltage VBIAS1 below VDD/2. Additionally or alternatively to varying the bias voltage VBIAS1, the reference voltage VBIAS2 may be adjusted to set the voltage at the working electrode WE, and therefore the electrochemical cell 100.

The circuitry 200 shown in FIG. 2 may be used for electrochemical impedance spectroscopy (EIS). The electrochemical cell 100 may be interrogated to obtain information about a condition of the electrochemical cell 100, which may be used to improve measurements taken using the circuitry 200. Due to inherent non-linearity of the electrical cell 100 and the inherent linearity of impedance, stimulation amplitudes used to measure impedance tend to be low. As such, the signal-to-noise ratio (SNR) of impedance measurements using the electrochemical cell 100 tend to be low. To account for this low SNR, acquisition times can be increased. However, particularly since the ADC 206 is a dominant power consumer, extending acquisition times can lead to an increase in power consumption. This is particularly disadvantageous when the circuitry 200 is battery powered.

Therefore, to reduce power consumption of the circuitry 200, it may be advantageous to minimise the time taken to perform a measurement of the electrochemical cell 100, and therefore an on-time of the ADC 206. Due to the SNR limitations associated with conventional circuitry, such as that shown in FIG. 2, implementing EIS using such circuitry is less attractive for battery powered applications, despite the advantages EIS can bring to sensor calibration and condition monitoring.

Embodiments of the present disclosure aim to address or at least ameliorate one or more of the above issues by increasing the amplitude of the stimulus applied to the electrochemical cell 100 at the cost of non-linearity distorting the measured response of the cell 100 to the stimulus. To do so, a stimulus may be used that allows for orthogonalization of linear and non-linear components of the measured response. An example of such a stimulus is an exponential chirp signal. An exponential chirp signal allows for the separation of linear and non-linear components of the measured response such that the linear component containing cell impedance information can be more easily extracted from the measured response. The use of an exponential chirp signal increases energy at lower frequencies (which are associated with higher impedance and thus less current flow). By spending proportionally more time at lower frequencies, the effective SNR of measurement of impedance is increased.

Figure 3:
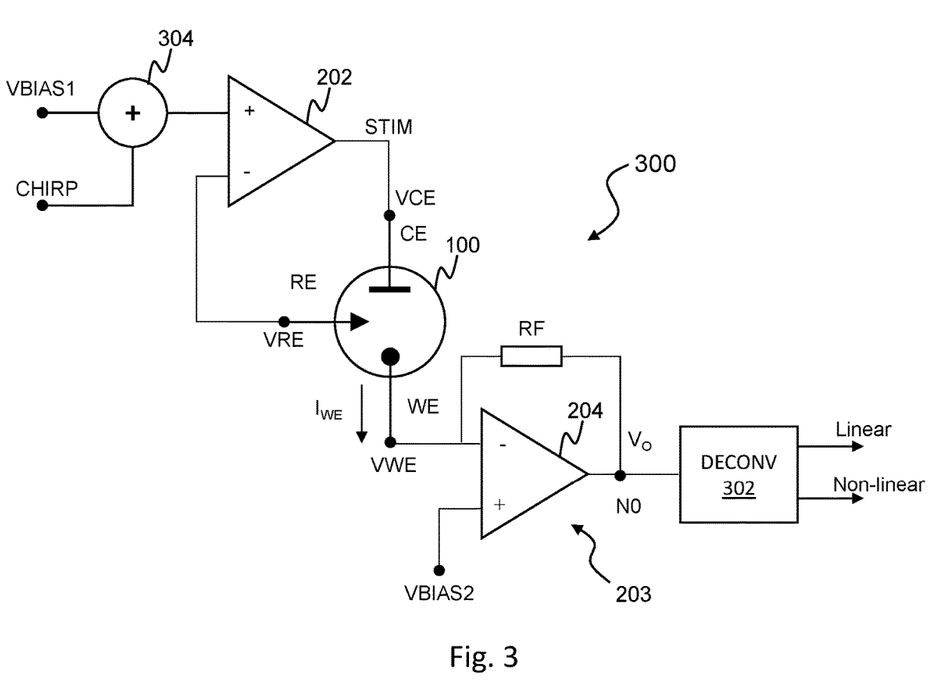
FIG. 3 is a schematic diagram of a drive and measurement circuit for measuring characteristics of an electrochemical cell.

FIG. 3 illustrates an example drive and measurement circuit 300 according to embodiments of the present disclosure. The circuit 300 differs from the circuit 200 of FIG. 2 in that the ADC 206 has been replaced with a deconvolution unit 302 coupled to the output of the gain stage 203. In addition, instead of the bias voltage VBIAS1 being provided to the first amplifier 202, the bias voltage VBIAS1 is combined with a chirp signal CHIRP at an adder 304 to generate a stimulus signal STIM at the output of the first amplifier 202 and therefore the counter electrode CE. The resultant current IWE may then be measured at the working electrode WE of the cell 100. The chirp signal CHIRP may be applied in addition to the bias voltage VBIAS1. Alternatively, the chirp signal CHIRP may be pre-biased and applied on its own (i.e. without being added to the bias voltage VBIAS).

Like the circuit 200 of FIG. 2, the gain stage 203 is operable to output an output voltage VO at an output node NO which is proportional to the current IWE at the working electrode WE. This output voltage VO is provided to the deconvolution unit 302 which is configured to calculate a linear component and a non-linear component of the output voltage VO. In other words, the deconvolution unit 302 is configured to separate the linear and non-linear components of the output voltage VO. It will be appreciated that in some circumstances, such as where the cell 100 is very new (not aged), the non-linear component may be zero, i.e., the output voltage VO may only comprise a linear component.

In some embodiments, the chirp signal CHIRP may be an exponential chirp signal. For example, the chirp signal CHIRP may be in the form:

$$CHIRP = \sin\left(k\left\{e^{\frac{t}{\lambda}-1}\right\}\right)$$

Where k is the rate of exponential change in frequency of the CHIRP, as defined as:

$$k = t_{CHIRP} \cdot \frac{\omega_{min}}{\log\left(\frac{\omega_{max}}{\omega_{min}}\right)}$$

Where $\omega_{min}$ is the minimum angular frequency of the chirp signal, $\omega_{max}$ is the maximum angular frequency of the chirp signal and $t_{CHIRP}$ is the duration of the chirp.

The resultant current IWE at the working electrode WE, which is converted to the output voltage VO by the gain stage 203, represents the impedance of the cell 100 convolved with the applied stimulus signal STIM.

To extract the impedance of the cell 100 (i.e., the linear component of the working electrode current IWE), the non-linear component (relating to the stimulus) may be removed or separated from the linear component. Removal/separation of the non-linear component may be performed by deconvolution or similar process using a suitable waveform. In the time domain, a suitable waveform to perform such deconvolution is a time-reversed version of the chirp signal CHIRP, augmented by a weighting W, which may be given by the following equation:

$$W = \exp\left(\frac{t}{\lambda}\right)$$

Figure 4:
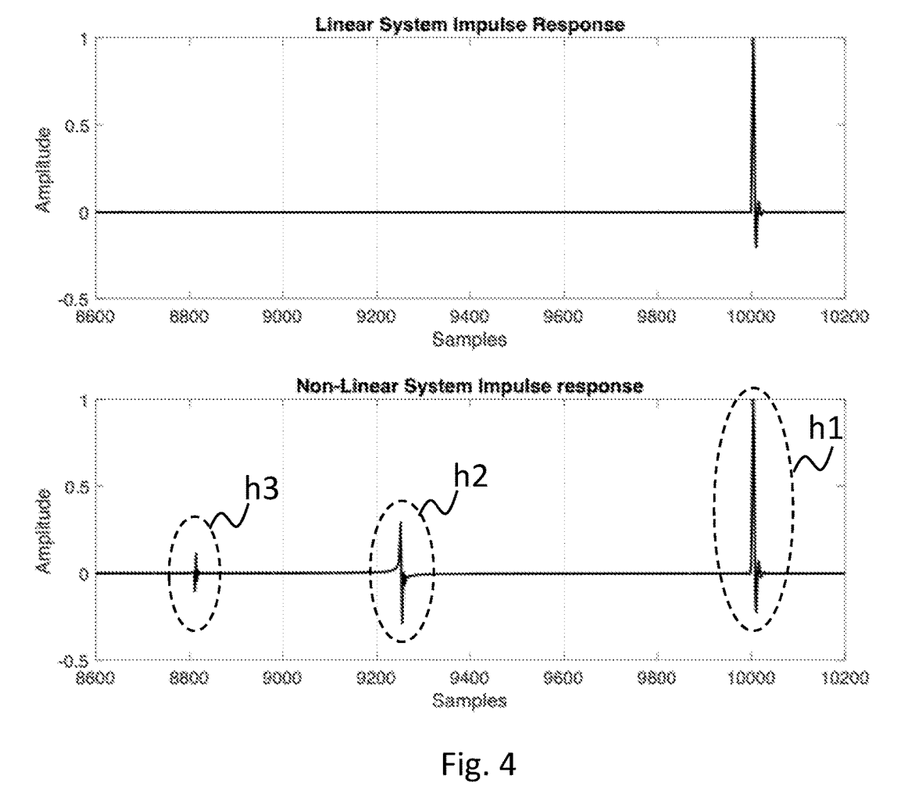
FIG. 4 is a graph illustrating impulse responses of linear and non-linear components of a measured response of the electrochemical cell.

An example of the resultant sampled and deconvoluted output voltage VO is shown in FIG. 4. It can be seen that the resultant deconvoluted output signal consists of a series of impulse responses h1, h2, h3 each corresponding to a different harmonic. The first order (or fundamental) harmonic h1 corresponds to the linear component of measured working electrode current IWE. This first order harmonic h1 may be output as a linear component from the deconvolution module 302. This first order harmonic h1 may be used to calculate a linear transfer function TFL associated with the cell 100. The second and third order harmonics h2, h3 correspond to non-linear components of the measured working electrode current IWE.

To reduce computational complexity, it may be preferable to perform convolution and/or deconvolution in the frequency domain, for example by using a Fourier transform or other suitable frequency transform. In the frequency domain, deconvolution can be approximated using a point-wise division of the received signal by the Fourier transform of the transmitted signal.

Figure 5:
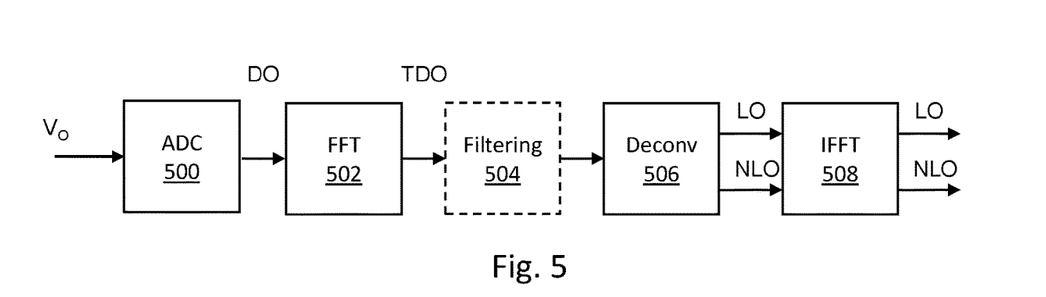
FIG. 5 is an example process diagram for the deconvolution module of FIG. 3.

An example process 500 for separating linear and non-linear components of the output voltage VO (which represents the measured response of the cell 100 to the stimulus STIM) will now be described with reference to FIG. 5. It will be appreciated that this process could equally be applied directly to the working electrode current IWE before being converted to an output voltage VO by the gain stage 203.

At step 501, the output voltage VO may be converted to a digital output DO.

At step 502, the Fourier transform (e.g., fast Fourier transform (FFT)) of the digital output DO may be calculated.

Optionally, at step 504, the transformed digital output TDO may be filtered and/or smoothed to reduce or remove noise.

At step 506, deconvolution or equivalent may be performed on the filtered transformed output voltage to obtain linear and non-linear output components LO, NLO using one of the following techniques:

1. A point-wise division of the filtered transformed digital output TDO by the Fourier transform of the stimulus signal STIM or the chirp signal CHIRP.
2. A point-wise multiplication of the filtered transformed digital output TDO by an inverse of the stimulus signal STIM or the chirp signal CHIRP.
3. A deconvolution (e.g., using either of the techniques described at points 1 and 2 above or another deconvolution technique) with regularisation (using any conceivable regularisation approach).

At step 508, an inverse Fourier transform technique (such as an inverse fast Fourier transform) may be applied to the deconvolved signal output at step 506 to output time domain representations of the linear and non-linear output components LO, NLO.

Since convolution in the Fourier domain is cyclic, a zero pad may be used to avoid wrapping. Such a zero pad may be applied to both the stimulus signal STIM and the reference signal. Zero padding techniques are known in the art and so will not be explained in detail here.

A point-wise multiplication approach which may be implemented at step 506 may be represented as shown below, where $\mathcal{F}$ represents a Fourier transform and $\mathcal{F}^{-1}$ represents an inverse Fourier transform.

$$y = \mathcal{F}^{-1}\{\mathcal{F}(VO) \cdot \mathcal{F}(STIM)\}$$

As noted above, deconvolution may be implemented with any known regularisation method to improve efficiency in parameter estimation during deconvolution, thereby further reducing computation. For example, ridge (Tikhonov) regularisation may be performed. An example regularised point-wise multiplication approach may be represented as shown below.

$$y = \mathcal{F}^{-1}\left\{\frac{\mathcal{F}(STIM) \cdot \mathcal{F}^*(VO)}{\mathcal{F}(STIM) \cdot \mathcal{F}^*(STIM) + \lambda \cdot \mathcal{F}(STIM) \cdot \mathcal{F}^*(STIM)}\right\}$$

Where $\lambda$ is a regularisation term which may be adjusted. For example, $\lambda$ may be adjusted as a function of noise, such that as noise increased regularisation is increased. In some embodiments, such regularisation may be pre-set. A typical value of $\lambda$ may be 0.1.

In some embodiments, one or more values of (or values derived from) the chirp signal CHIRP and the stimulus STIM may be calculated and stored in memory (not shown) for use by the deconvolution module 302 in calculating linear and non-linear components of the output voltage VO. For example, since the chirp signal CHIRP signal is known, a frequency domain representation of the stimulus signal STIM may be pre-calculated based on the chirp signal CHIRP. This stored frequency domain representation of the stimulus signal STIM may be used to deconvolute the output voltage VO by the deconvolution module 302, e.g., using point-wise division. In another example, an inverse of the frequency domain representation of the stimulus signal STIM may be pre-calculated and stored. By storing the inverse frequency domain representation, a point-wise multiplication operation may be performed instead of a division operation, thereby reducing the computational resource required to deconvolute the output voltage VO by the deconvolution module 302.

The effect of deconvolution in separating linear and non-linear components of a measured response to the stimulus signal STIM is illustrated with reference to FIGS. 6 and 7.

Figure 6:
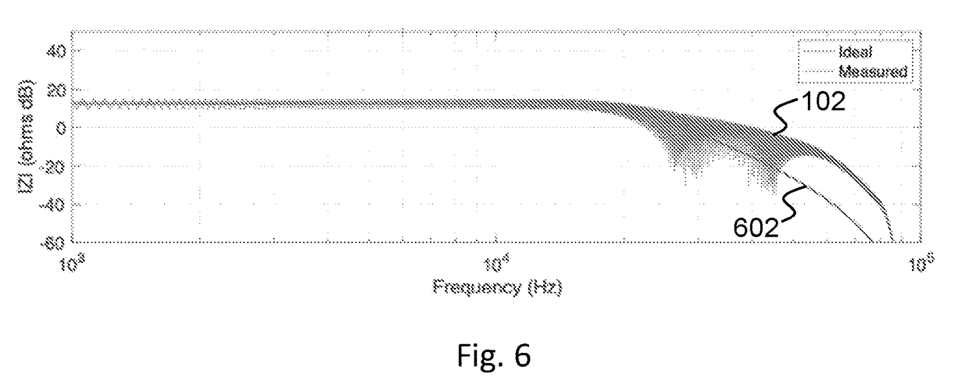
FIGS. 6 and 7 are impedance spectrums for measured responses with non-linear harmonic distortion present and removed.

FIG. 6 graphically illustrates a modelled ideal impedance spectrum 602 and a measured impedance spectrum 604 of the cell 100. The measured impedance spectrum 604 comprises both linear and non-linear components. In other words, the non-linear components have not been removed by the deconvolution module 302. It can be seen that significant distortion is present in the measured impedance spectrum 604, particularly at higher frequencies, for example in excess of 10 kHz.

Figure 7:
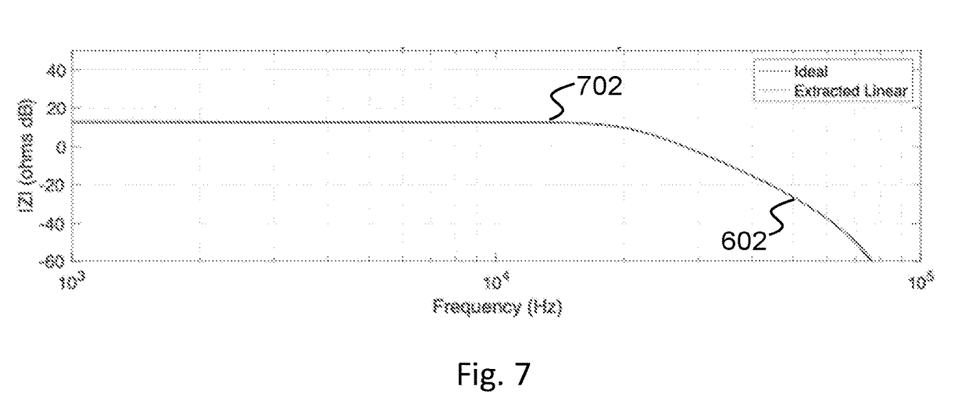

FIG. 7 graphically illustrates the modelled ideal impedance spectrum 602 and a processed measured impedance spectrum 702 of the cell 100 with the non-linear component removed by the deconvolution module 302. It can be seen that, in contrast to FIG. 6, significantly less distortion is present in the processed measured impedance spectrum 702, which closely matches the modelled ideal impedance spectrum 602.

With the above in mind, the circuitry 300 may be operated in several modes depending on various considerations.

In a power saving mode, an objective may be to reduce acquisition time required for EIS and, in turn, reduce power consumption of the circuitry 300. To do so, the amplitude of the stimulus signal STIM may be increased at the detriment of linearity of the measured response. However, linear and non-linear components of the measured response may then be separated to enable an accurate estimate of impedance in which distortion due to non-linearity has been removed.

A spectrum of the impedance Z of the cell 100 can be derived by calculating the Fourier transform of each harmonic in a measured response. An equation for this impedance calculation for the linear component of the measured response is shown below:

$$Z = \mathcal{F}\{h_1\}$$

The spectrum of the non-linear component of impedance associated with the nth order harmonic of the measured response may be given by the following equation, where n>1:

$$Z_n = \mathcal{F}\{h_n\}$$

Figure 8:
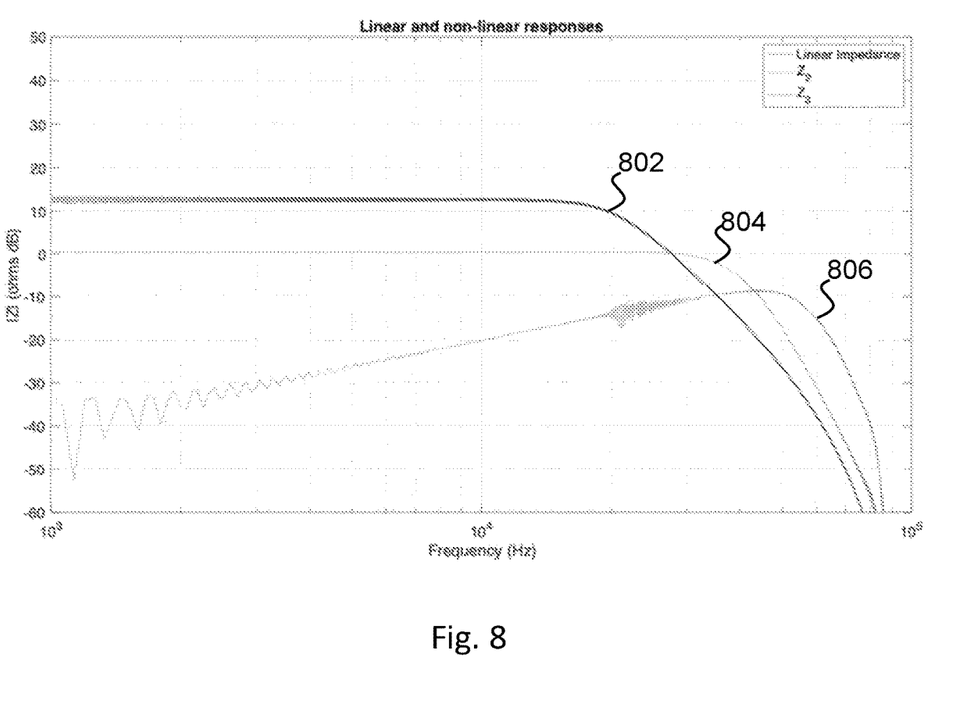
FIG. 8 is a graphical illustration of impedance spectrums for various harmonics of a measured response.

FIG. 8 graphically illustrate linear and non-linear impedance as a function of frequency (i.e., impedance spectrums) for first, second and third order harmonics 802, 804, 806 of a measured response of the cell 100 to the stimulus signal STIM. The first order (fundamental) harmonic 802 pertain to the linear component of the measured response. The second and third order harmonics 804, 806 pertain to the non-linear components of the measured response.

It can be seen from FIG. 8 that the first and second order harmonics 802, 804 are low-pass functions, whereas the third order harmonic 806 is a bandpass function. Furthermore, whilst the first and second harmonics 802, 804 are both low-pass functions, their impedance values and cut-off frequencies are different. It will be appreciated, therefore that the first, second and third harmonics 804, 806 can be extracted or removed separately to obtain various information pertaining to the cell 100 (including the characteristics of an analyte present in the cell 100 as well as a condition of the cell 100 itself). As such, in the power saving mode, non-linear components present due to high amplitude of the stimulus signal STIM can be removed.

In some embodiments, the process of calculating the impedance spectrum of the measured response can be repeated one or more times to derive an average of linear and harmonic (non-linear) impedance spectrums. In doing so, sensitivity to impulsive noise in the circuitry 300 can be reduced leading to improved estimation of impedance of the cell 100.

In addition to reducing power consumption, it may be advantageous to induce a non-linear response from the cell 100 for other reasons. For example, non-linearity of the cell 100 may be associated with a condition associated with the cell 100, such as the cell 100's age, damage to the cell 100, a fault at the cell 100 or associated circuitry, or another adverse condition of the cell 100. Accordingly, in some embodiments, harmonic content in the measured response (i.e. the output voltage VO) may be extracted and analysed to determine the condition of the cell 100.

Such analysis of the extracted harmonic content may comprise monitoring a change in a characteristic of the harmonic content over time. For example, an amplitude of harmonic distortion in the measured output voltage VO may be measured. The amplitude of the harmonic distortion may be measured at a specific frequency or band of frequencies. A change in amplitude of the harmonic distortion over time may correspond to an impact of ageing of the cell 100 or associated circuitry. For example, it has been found that an increase in the amplitude of harmonic distortion may correspond to an increase in age of the cell 100. In some embodiments, the second order harmonic h2 of the measured output voltage VO may be used to determine a condition of the cell 100.

Based on the analysis of the extracted harmonic content, the measured linear impedance may be adjusted to account for the condition of the cell 100. For example, if over time it is determined that the cell 100 is ageing, the circuitry 300 may apply a gain term to extracted linear component LO to compensate for this ageing.

The extracted harmonic content may also be processed to determine whether a fault or error has occurred at the cell 100. For example, if a measured amplitude of harmonic distortion, at a particular frequency or band of frequencies, exceeds a threshold amplitude, this can be an indicator that a fault or error has occurred at the cell 100 or associated circuitry. As a result, the circuitry 300 may be configured to flag any associated data as unreliable and/or place the cell 100 in a fault mode.

It will be appreciated that information from any of the higher order harmonics in measured output voltage VO may be used to determine a condition of the cell 100 and/or to calibrate processing of the linear component LO of the output voltage VO. Preferably, however, the harmonic having the largest amplitude may be used. The second order harmonic h2 tends to have the largest amplitude and is therefore easiest to measure.

Embodiments above are described with reference to a three-electrode cell 100 comprising a counter electrode CE, a working electrode WE and a reference electrode RE. Embodiments of the disclosure are not, however, limited to having three-electrodes. The concepts described herein are equally applicable to two-electrode cells. In particular, in any of the embodiments described above, the three-electrode cell 100 may be replaced with a two-electrode cell.

Figure 9:
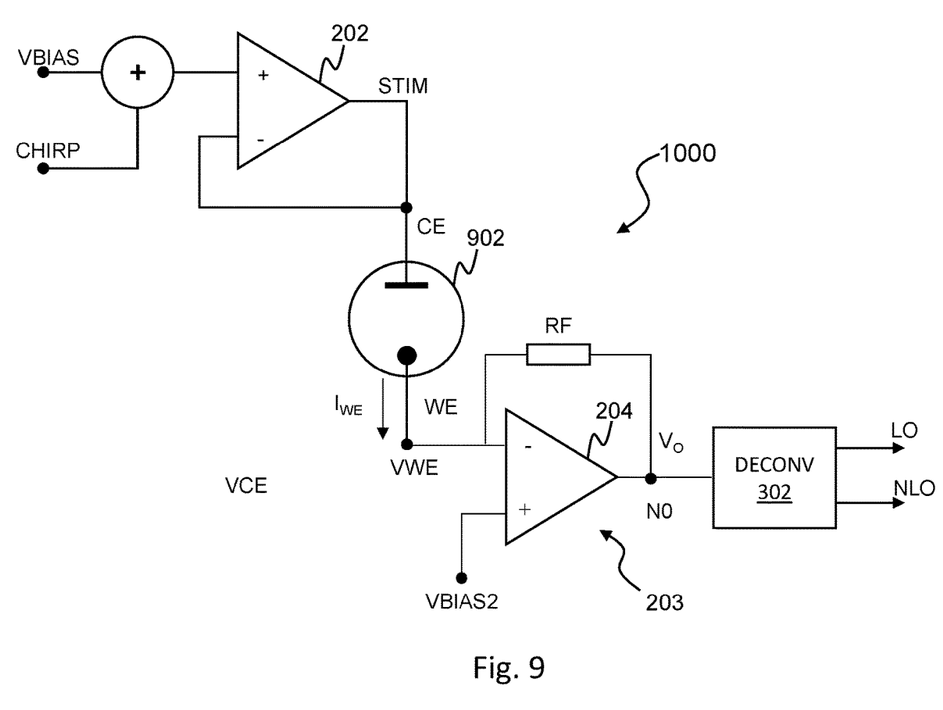
FIG. 9 is schematic diagram of a drive and measurement circuit for measuring characteristics of a two-electrode electrochemical cell.

FIG. 9 illustrates a drive and measurement circuit 900 which is a variation of the circuit 300 shown in FIG. 3, the three-electrode cell 100 having been replaced with a two-electrode cell 902 comprising a counter electrode CE and a working electrode WE. Instead of the non-inverting input of the first amplifier 202 being coupled to the reference electrode RE of the cell 100, the non-inverting input of the first amplifier 202 is coupled to the counter electrode CE of the two-electrode cell 902.

In the embodiments described above, the gain stage 203 is implemented as a transimpedance amplifier (TIA). It will be appreciated, however, that embodiments of the present disclosure are not limited to such an implementation.

Figure 10:
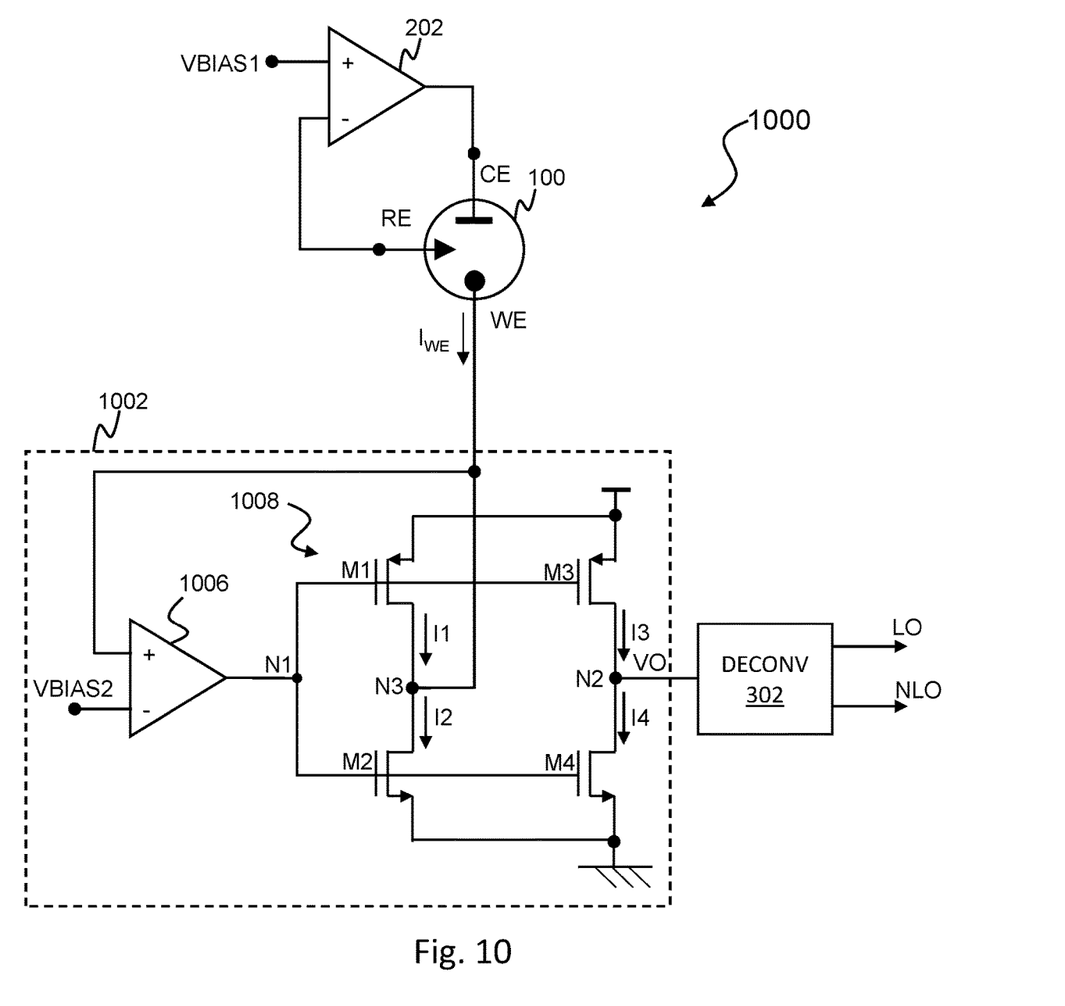
FIG. 10 is schematic diagram of a drive and measurement circuit.

FIG. 10 illustrates another example prior art drive and measurement circuit 1000 which implements an alternative measurement regime to the drive and measurement circuit 300 shown in FIG. 3. Common parts of the circuits 300, 1000 of FIGS. 3 and 10 are denoted with common reference numerals.

Like the circuit 300, the circuit 1000 comprises the first amplifier 202 having a non-inverting input coupled to a bias voltage VBIAS1 and an inverting input coupled to the reference electrode RE. The output of the first amplifier 202 is coupled to the counter electrode CE and configured to drive the counter electrode CE with a counter electrode bias voltage VCE. The counter electrode bias voltage VCE applied at the counter electrode CE by the first amplifier 202 is proportional to the difference between the bias voltage VBIAS1 and the voltage VRE at the reference electrode RE.

The circuit 1000 further comprises a measurement circuit 1002 and the deconvolution module 302. The measurement circuit 1002 is implemented as a current conveyor. In this example, the measurement circuitry 1002 implements a second generation current conveyor (CCII) although other current conveyor topologies could be implemented without departing from the scope of the present disclosure. The measurement circuit 1002 comprises a second amplifier 1006 (e.g., an operational amplifier) and current mirror circuitry 1008 comprising first, second, third and fourth transistors M1, M2, M3, M4. In this example, the transistors M1:M4 are MOSFETs. In this example, the first and third transistors M1, M3 are PMOS devices and the second and fourth transistors M2, M4 are NMOS devices.

The second amplifier 1006 comprises a non-inverting input coupled to the working electrode WE, an inverting input coupled to a reference voltage VBIAS2 and an output coupled to a first (intermediate) node N1.

Gates of each of the first, second, third and fourth transistors M1:M4 are coupled to the first node N1 and therefore the output of the second amplifier 1006. Drains of the first and third transistor M1, M3 are coupled to a supply voltage VDD. Sources of the first and third transistors M1, M3 are coupled to drains of the second and fourth transistors M2, M4, respectively. Sources of the second and fourth transistors M2, M4 are coupled to a ground reference voltage (GND). The source of the third transistor M3 and the drain of the fourth transistor M4 are coupled at a second (output) node N2 to the input of the deconvolution module 302. The source of the first transistor M1 and the drain of the second transistor M2 are coupled at a third (feedback) node N3 to the working electrode WE. As such, a feedback path is provided between the third node N3 and the non-inverting input of the second amplifier 1006. The amplifier 1006 is thus arranged as a unity gain amplifier or buffer amplifier. The first and second transistors M1, M2 operate as transconductors which generate first and second currents I1, I2 respectively. The working electrode current IWE is equal to the difference between the first and second currents (IWE=I2−I1). The first and second transistors M1, M2 act as input reference devices of a current mirror. The third and fourth transistors M3, M4 operate as output devices of the current mirror. The first current I1 is mirrored to a third current I3 generated by the third transistor N3. The second current I2 is mirrored to a fourth current I4 generated by the fourth transistor N4.

During operation, the working electrode current IWE is provided to the second amplifier 1006 and this current IWE is amplified by unity and therefore buffered to the first node N1. The second amplifier 1006 amplifiers the difference between the working electrode voltage VWE and the reference voltage VBIAS2. Combined with the negative feedback from the third node N3, the result is that the error voltage VWE-VBIAS2 becomes zero such that VBIAS2 and VWE become equal. Respective first and second currents I1, I2 are copied as respective third and fourth currents I3, I4 such that the output voltage VO is a copy of the current IWE.

The measurement circuit 1002 of FIG. 10 has an advantage of ensuring low output impedance (when compared to the circuit 300) at each of the counter, reference and working electrodes CE, RE, WE, since the working electrode WE is driven directly by the first and second transistors M1, M2. Since the load across the electrochemical cell 100 is highly capacitive in nature, this inherent low output impedance may be advantageous when a stimulus of high amplitude and/or frequency is driven over the electrochemical cell 100 (such as in various embodiments described above, where the cell 100 is stimulated at high amplitude to obtain EIS measurements with higher SNR).

Embodiments are described above with reference to cells 100, 902 comprising a single counter electrode CE and a single working electrode WE. Embodiments of the disclosure are not, however, limited to having cells having only one counter electrode or only one working electrode. The concepts described herein are equally applicable to cells comprising multiple working electrodes or multiple counter electrodes. In doing so, such sensors may either be providing redundancy or enabling the sensing of multiple analytes in a single chip. This may be particularly advantageous in applications such as continuous glucose monitoring, where it may be desirable to measure concentrations of several analytes including but not limited to two or more of glucose, ketones, oxygen, lactate, and the like.

Figure 11:
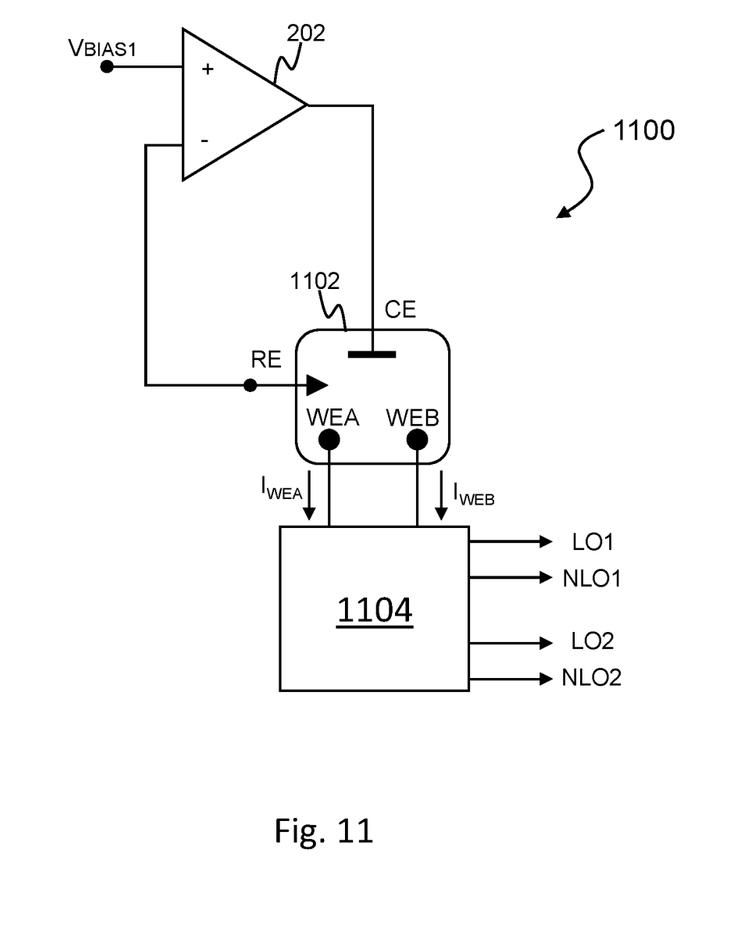
FIG. 11 illustrates an example drive and measurement circuit.

FIG. 11 illustrates an example drive and measurement circuit 1100. Where like parts have been given like numbering. In the circuit 1100, an electrochemical cell 1102 comprising first and second working electrode WEA, WEB, a counter electrode CE and a reference electrode RE. A measurement circuit 1104 is provided which outputs first linear and non-linear output signals LO1, NLO1 based on a current IWEA derived from the first working electrode WEA and outputs second linear and non-linear output signals LO2, NLO2 based on a current IWEB derived from the second working electrode WEB. The measurement circuit 1104 may, for example, comprise two processing channels, each processing channel implementing the circuitry shown in FIG. 3. Alternatively, various components of the circuitry 300 shown in FIG. 3 may be shared between the two processing channels, e.g., through multiplexing or similar known techniques.

In the embodiments described herein, the electrochemical cells 100, 502, 1102 have been described in the form of an electrochemical sensor comprising counter and working electrodes CE, WE, also known in the art as a potentiostat. For such sensors, the stimulus is typically a voltage, and the measured response is a current. It will be appreciated that embodiments of the present disclosure are not limited to such cells and extend to other types of cells, such as electrochemical cells acting as a power source (i.e. a battery). For batteries and the like, the driving stimulus of the cell is typically a current, and the measured response a voltage.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. Circuitry for determining an impedance of an electrochemical cell comprising at least one first electrode and a second electrode, the circuitry comprising:
   drive circuitry configured to apply a stimulus to the at least one first electrode of electrochemical cell, the stimulus having a stimulation frequency and a stimulation amplitude; and
   measurement circuitry configured to:
      measure an output of the electrochemical cell to generate an output signal;
      separate the output signal into a linear component and a non-linear component; and
      determine the impedance of the cell based on the linear component of the response;
   wherein separating the output signal comprises deconvolving the output signal with the stimulus.

2. Circuitry of claim 1, wherein the stimulus comprises a chirp signal.

3. Circuitry of claim 2, wherein the chirp signal is an exponential chirp signal.

4. Circuitry of claim 2, wherein the drive circuitry is configured to hold the at least one electrode at a first bias voltage, the chirp signal applied in addition to the first bias voltage.

5. Circuitry of claim 4, wherein the electrochemical cell comprises a reference electrode, the drive circuitry configured to provide the first bias voltage to the reference electrode.

6. Circuitry of claim 1, wherein the stimulus is configured to induce a linear response from the electrochemical cell to generate the linear component and a non-linear response from the electrochemical cell to generate the non-linear component.

7. Circuitry of claim 1, wherein separating the output signal comprises:
   weighting the stimulus to generate a weighted stimulus; and
   deconvolving the output signal with the weighted stimulus.

8. Circuitry of claim 7, wherein weighting the stimulus comprises whitening the stimulus.

9. Circuitry of claim 7, wherein weighting the stimulus comprises:
   time-reversing the stimulus to generate the weighted stimulus.

10. Circuitry of claim 1, wherein prior to separating the output signal the measurement circuitry is configured to:
    convert the output signal into the frequency domain, wherein deconvolution is performed in the frequency domain.

11. Circuitry of claim 10, wherein deconvolving the output signal with the stimulus comprises:
    performing a point-wise division of the converted output signal by a Fourier transform of the stimulus.

12. Circuitry of claim 10, wherein deconvolving the output signal with the stimulus comprises:
    performing a point-wise multiplication of the converted output signal by a Fourier transform of an inverse of the stimulus.

13. Circuitry of claim 11, wherein deconvolving the output signal is implemented with regularisation.

14. Circuitry of claim 1, wherein the measurement circuitry is configured to:
    determine a condition of the electrochemical cell based on the non-linear component of the response.

15. Circuitry of claim 14, wherein the condition comprises ageing of the electrochemical cell.

16. Circuitry of claim 14, wherein the measurement circuitry is configured to separate the non-linear component into a plurality of different harmonics.

17. Circuitry of claim 14, wherein the measurement circuitry is configured to:
monitor a characteristic of the non-linear component of the response over time; and
determine a condition of the electrochemical cell based on a change in the characteristic.

18. Circuitry of claim 17, wherein the characteristic comprises an amplitude of harmonic distortion in the measured response.

19. Circuitry of claim 18, wherein the characteristic comprises an amplitude of second order harmonic distortion in the measured response.

20. Circuitry of claim 16, wherein the condition comprises a fault associated with the electrochemical cell, and wherein determining the fault comprises:
determining that an amplitude of harmonic distortion in the measured response exceeds a predetermined threshold.

21. Circuitry of claim 1, wherein the measurement circuitry is configured to:
calibrate the linear component of the measured response based on the non-linear component of the response.

22. Circuitry of claim 1, wherein the output signal is an output voltage, wherein the measurement circuitry comprises:
a transimpedance amplifier (TIA) configured to convert the output of the electrochemical cell to the output voltage; and
an analog-to-digital converter configured to convert the output voltage to a digital output voltage.

23. Circuitry of claim 1, wherein the output signal is an output voltage, wherein the measurement circuitry comprises:
a current conveyor configured to convert the output of the electrochemical cell to the output voltage; and
an analog-to-digital converter configured to convert the output voltage to a digital output voltage.

24. A system, comprising:
circuitry of claim 1; and
the electrochemical cell.

25. The system of claim 24, wherein the electrochemical cell comprises an electrochemical sensor.

26. The system of claim 24, wherein the electrochemical cell comprises a battery cell.

27. An electronic device, comprising the circuitry of claim 1.

28. The electronic device of claim 27, wherein the device comprises one of a continuous glucose monitor, a mobile computing device, a laptop computer, a tablet computer, a games console, a remote control device, a home automation controller or a domestic appliance, a toy, a robot, an audio player, a video player, or a mobile telephone, and a smartphone.

29. Circuitry for determining an impedance of an electrochemical cell comprising at least one first electrode and a second electrode, the circuitry comprising:
drive circuitry configured to apply a stimulus to the at least one first electrode of electrochemical cell, the stimulus having a stimulation frequency and a stimulation amplitude; and
measurement circuitry configured to:
measure an output of the electrochemical cell to generate an output signal;
separate the output signal into a linear component and a non-linear component; and
determine the impedance of the cell based on the linear component of the response,
wherein the stimulus comprises a chirp signal, wherein the drive circuitry is configured to hold the at least one electrode at a first bias voltage, the chirp signal applied in addition to the first bias voltage.

30. Circuitry for determining an impedance of an electrochemical cell comprising at least one first electrode and a second electrode, the circuitry comprising:
drive circuitry configured to apply a stimulus to the at least one first electrode of electrochemical cell, the stimulus having a stimulation frequency and a stimulation amplitude; and
measurement circuitry configured to:
measure an output of the electrochemical cell to generate an output signal;
separate the output signal into a linear component and a non-linear component; and
determine the impedance of the cell based on the linear component of the response,
wherein separating the output signal comprises:
weighting the stimulus to generate a weighted stimulus; and
deconvolving the output signal with the weighted stimulus.

* * * * *